United States Patent
Ostendorf et al.

(10) Patent No.: US 9,862,642 B2
(45) Date of Patent: Jan. 9, 2018

(54) CROSS-LINKABLE COMPOSITIONS BASED ON ORGANOSILICON COMPOUNDS AND THUS PRODUCED MOLDED BODIES

(71) Applicant: Wacker Chemie AG, Munich (DE)

(72) Inventors: Detlev Ostendorf, Dresden (DE); Uwe Scheim, Coswig (DE); Daniel Schildbach, Altoetting (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 14/915,085

(22) PCT Filed: Aug. 11, 2014

(86) PCT No.: PCT/EP2014/067166
§ 371 (c)(1),
(2) Date: Feb. 26, 2016

(87) PCT Pub. No.: WO2015/028296
PCT Pub. Date: Mar. 5, 2015

(65) Prior Publication Data
US 2016/0207833 A1    Jul. 21, 2016

(30) Foreign Application Priority Data

Aug. 28, 2013 (DE) .................. 10 2013 217 221

(51) Int. Cl.
C08L 83/04     (2006.01)
C04B 26/32     (2006.01)
C08K 3/00      (2006.01)

(52) U.S. Cl.
CPC ............ C04B 26/32 (2013.01); C08K 3/0033 (2013.01); C08L 83/04 (2013.01); *C08K 2201/005* (2013.01)

(58) Field of Classification Search
None
See application file for complete search history.

(56) References Cited

U.S. PATENT DOCUMENTS

| | | | |
|---|---|---|---|
| 3,108,985 A | 10/1963 | Weyer | |
| 3,350,330 A * | 10/1967 | Bessmer | C08K 9/06 404/19 |
| 3,775,452 A | 11/1973 | Karstedt | |
| 4,231,917 A * | 11/1980 | Zeldin | C04B 26/32 106/287.14 |
| 4,643,921 A | 2/1987 | Terabe et al. | |
| 4,698,010 A | 10/1987 | Toncelli | |
| 4,780,754 A * | 10/1988 | Liutkus | C04B 28/10 106/287.1 |
| 5,079,286 A * | 1/1992 | Hanisch | C08F 2/44 524/264 |
| 5,240,760 A * | 8/1993 | George | B01J 2/006 428/145 |
| 5,338,783 A * | 8/1994 | Olsen | C08K 3/36 106/287.1 |
| 6,399,678 B2 * | 6/2002 | Frankoski | B01F 7/00141 524/3 |
| 2005/0159522 A1 | 7/2005 | Bublewitz et al. | |
| 2009/0068441 A1 * | 3/2009 | Swaroop | C08K 3/0008 428/329 |
| 2009/0306263 A1 * | 12/2009 | Taguchi | C08L 83/04 524/404 |
| 2010/0063193 A1 | 3/2010 | Cruz | |
| 2011/0207849 A1 | 8/2011 | Cruz | |

FOREIGN PATENT DOCUMENTS

| | | |
|---|---|---|
| DE | 2504357 A1 | 8/1975 |
| DE | 103 252 B1 | 3/1987 |
| DE | 102 61 917 A1 | 7/2004 |
| EP | 1726622 A1 | 11/2006 |
| EP | 2281782 A1 | 2/2011 |
| ES | 2187313 B1 | 6/2003 |
| JP | 2008-534314 T2 | 8/2008 |
| SU | 638604 T | 12/1978 |

OTHER PUBLICATIONS

Particle size conversion table, taken from the 2003-2004 Aldrich chemical catalog, 1 page.*

* cited by examiner

*Primary Examiner* — Robert S Loewe
(74) *Attorney, Agent, or Firm* — Brooks Kushman P.C.

(57) ABSTRACT

Artificial stone which exhibits minimal visual change when exposed to weathering, UV light, and heat, is prepared by shaping and curing a crosslinkable composition based on crosslinkable organopolysiloxanes as a binder, at least 85% by weight of a filler component, the filler component containing at least 20% by weight of coarse grain mineral filler having grain sizes of 0.2 mm to 10 mm.

20 Claims, No Drawings

CROSS-LINKABLE COMPOSITIONS BASED ON ORGANOSILICON COMPOUNDS AND THUS PRODUCED MOLDED BODIES

CROSS REFERENCE TO RELATED APPLICATIONS

This application is the U.S. National Phase of PCT Appln. No. PCT/EP2014/067166 filed Aug. 11, 2014, which claims priority to German Application No. 10 2013 217 221.4 filed Aug. 28, 2013, the disclosures of which are incorporated in their entirety by reference herein.

BACKGROUND OF THE INVENTION

1. Field of the Invention

The invention relates to polymer-bonded artificial stone, to a method for the production thereof, and to crosslinkable compositions used therefor which are based on organosilicon compounds.

2. Description of the Related Art

Artificial stone consisting of organic polymer resins crosslinkable with suitable catalysts, and fillers such as substances comprising silicon dioxide (quartz, quartzite, granite, porphyry, sand, silicates, clays, etc.), substances comprising calcium carbonate (marble, limestone, dolomite, etc.), substances comprising calcium or barium sulfate, aluminum oxide, aluminum trihydrate, magnesium oxide, magnesium hydroxide, zinc oxide and silicon carbide, and methods for the production thereof, have been known for a long time. Examples thereof are to be found in U.S. Pat. No. 4,643,921 and in the documents mentioned as prior art, which are likewise to form part of the disclosure of the present specification.

The polymer resin base used thereby, for example in "Bretonstone®" or Silestone® technology, is a radically crosslinkable polyester resin in combination with a reactive solvent such as styrene or methyl methacrylate or mixtures thereof. Reference is made in this connection, for example, to U.S. Pat. No. 4,698,010 and ES-B 2 187 313.

Furthermore, there are methods for producing artificial stones which comprise, instead of the polyester resin, methacrylate resins, as described, for example, in document US-A 2011/0 207 849, wherein the documents mentioned as prior art in that document are likewise to form part of the disclosure of the present specification for the mentioned organic polymer resin binders based on polyester resin or methacrylate resins.

A disadvantage of all the artificial stone known hitherto is that the binders have only limited stability to UV radiation and weathering. This is outwardly visible because—in particular in the case of dark color shades—the colors of the artificial stones become significantly lighter and, in addition, they lose their sheen. Furthermore, the polymer matrix is not stable to heat, that is to say the polymers depolymerize with pronounced discoloration. Moreover, the cured organic polymer matrix, despite high filler content, is flammable and sometimes burns with a very sooty flame.

Filled compositions based on organosiloxanes are likewise described in the literature. DD-A 103 252, for example, claims a method for producing molding compositions based on silicone resins in admixture with linear organopolysiloxanes. DE-A 2 504 357 describes silicone resin molding compositions, the crosslinkable resin base of which is composed of organopolysiloxane having at least 1.0% by weight silicon-bonded OH groups and a linear diorganopolysiloxane having OH or triorganylsilyl end groups. U.S. Pat. No. 3,108,985 claims phenylalkylsiloxanes as the resin base. It is a disadvantage in all these cases that, despite high curing temperatures, only comparatively low hardnesses of the test specimens are achieved. In addition, harmful lead compounds are used as the catalyst.

Furthermore, in DE-A 102 61 917 molded bodies are produced on the basis of a two-component addition-crosslinking silicone material which comprises short-chained vinyl-terminated siloxanes and hydrogen siloxanes as crosslinkable components and a platinum catalyst. Compositions having a filler content of up to 75% are described. It is a disadvantage that higher degrees of filling cannot be achieved without the processability being impaired and the mechanical properties diminishing very greatly.

SUMMARY OF THE INVENTION

The invention provides crosslinkable compositions (M) based on organosilicon compounds (A) having a content of fillers (B) of at least 85% by weight, with the proviso that component (B) consists at least in part of coarse-grained fillers with grain sizes of from 0.2 mm to 10 mm. The invention further provides a method for producing molded bodies based on organosilicon compounds, characterized in that the crosslinkable compositions (M) according to the invention are shaped and cured.

DETAILED DESCRIPTION OF THE PREFERRED EMBODIMENTS

In a preferred embodiment of the method according to the invention, the crosslinkable compositions (M) based on organosilicon compounds (A) having a content of fillers (B) of at least 85% by weight are shaped by means of mechanical pressure, wherein the excess air in the composition is optionally removed partially or completely during shaping by the application of an atmospheric low pressure to the mold, and further densification is optionally achieved during and/or after shaping by vibration of the mold, and the compositions are made to cure during and/or after shaping by increasing the temperature.

The excess air which is optionally removed when the method according to the invention is carried out is preferably air that has unavoidably and unintentionally been enclosed in the composition during preparation of the mixture. Removal of the excess air according to the invention is preferably performed, preferably at an atmospheric pressure of less than 300 mbar, more preferably less than 100 mbar, and in particular less than 50 mbar.

The mechanical pressure during the shaping according to the invention is preferably at least 200 kPa, more preferably at least 400 kPa, and in particular at least 600 kPa.

The shaping according to the invention is preferably carried out at temperatures of from 20 to 200° C., more preferably at from 20 to 120° C., and in particular at ambient temperature.

If further densification by vibration of the mold is carried out in the method according to the invention, as is preferred, such densification preferably takes place at a vibration frequency of at least 10 Hz, more preferably at least 30 Hz, and in particular at least 40 Hz.

In the method according to the invention, curing of the crosslinkable compositions is preferably carried out at from 20 to 200° C., more preferably at from 50 to 200° C.; the compositions (M) are preferably cured for a period of from 10 to 120 minutes; and curing of the compositions (M) preferably takes place at the same time as the shaping. In a further embodiment of the method, curing of the compositions (M) takes place following shaping, separately therefrom.

The organosilicon compounds (A) used according to the invention are already known and can be prepared by any desired methods known hitherto, such as, for example, by hydrolysis and condensation of mixtures of the corresponding chlorosilanes, alkoxysilanes or partially alkoxylated chlorosilanes.

The fillers (B) used according to the invention can be any desired fillers known hitherto, wherein the fillers can be coarse-grained or finely divided. The fillers (B) are preferably mixtures of finely divided and coarse-grained fillers (B).

The finely divided fillers (B) used according to the invention preferably have grain sizes of from 0.02 to 200 μm, more preferably from 0.3 to 100 μm. In the case of fibrous fillers, the longest extent corresponds to the grain size.

The coarse-grained fillers (B) used according to the invention preferably have grain sizes of from 0.2 mm to 10 mm, more preferably from 0.2 mm to 5 mm, and in particular from 0.2 mm to 3 mm. In particular, quartz is used as the coarse-grained filler (B).

Component (B) used according to the invention preferably consists of at least 20% by weight of coarse-grained fillers with grain sizes of from 0.2 mm to 10 mm, more preferably from 40 to 80% by weight of coarse-grained fillers with grain sizes of from 0.2 mm to 10 mm, in each case based on the total amount of (B).

If mixtures of finely divided and coarse-grained fillers are used as fillers (B), the ratio by weight of finely divided to coarse-grained fillers is preferably from 4:1 to 1:4, more preferably from 3:2 to 1:4.

The grain size distribution of particles >500 μm is preferably analyzed using an e200 LS air jet sieve from ALPINE using analytical sieves according to the requirements of DIN ISO 3310-1. Analysis of the particle size distribution in the range of from 0.02 to 500 μm is preferably carried out using a CILAS 1064 PARTICLE SIZE ANALYZER from Cilas.

The compositions according to the invention preferably comprise fillers (B) in amounts of, in total, of from 90 to 99 parts by weight, more preferably from 90 to 96 parts by weight, in each case based on 100 parts by weight of the crosslinkable composition (M).

Examples of fillers (B) used according to the invention are non-reinforcing fillers, that is to say fillers preferably having a BET surface area of preferably up to 50 $m^2/g$, such as quartz powder, quartz granules, molten quartz powder, quartz glass powder, glass powder, diatomaceous earth, calcium silicate, magnesium silicate, zirconium silicate, talcum, kaolin, zeolites, metal oxide powders, such as oxides of aluminum, titanium, zirconium, or iron or zinc oxides, or mixed oxides thereof, barium sulfate, calcium carbonate, marble powder, gypsum, silicon nitride, silicon carbide, boron nitride, as well as reinforcing fillers, that is to say fillers having a BET surface area of more than 50 $m^2/g$, such as pyrogenic silica, precipitated silica, precipitated chalk, carbon black such as furnace and acetylene black, and silicon-aluminum mixed oxides having a large BET surface area; as well as aluminum trihydroxide, magnesium hydroxide; fibrous fillers such as wollastonite, montmorillonite, bentonite, chopped and/or ground fibers of glass (short glass fibers), or mineral wool. The mentioned fillers can be rendered hydrophobic, for example by treatment with organo-silanes or organo-siloxanes or with stearic acid.

The fillers (B) that are used are preferably aluminum trihydroxide or inorganic silicon-containing fillers, in particular those from natural sources, such as quartz, cristobalite, talcum, and fibrous silicon-containing fillers from natural sources, such as montmorillonite and wollastonite, or synthetic silicon-containing products such as pyrogenic silica, which can be obtained by flame hydrolysis of, for example, tetrachlorosilane in an oxyhydrogen flame (fumed silica), or amorphous quartz, which is obtainable by thermal after-treatment of pyrogenic silica (fused silica), or inorganic fibrous synthetic silicon-containing fillers, such as chopped or ground short glass fibers.

Component (B) is most preferably quartz, cristobalite, chopped or ground short glass fibers, montmorillonite, wollastonite or talc, which can optionally be surface-treated.

The compositions (M) according to the invention used in the method according to the invention are preferably compositions comprising
(A) 100 parts by weight of at least one crosslinkable organosilicon compound,
(B) from 900 to 2400 parts by weight of at least one filler,
optionally (C) catalysts,
optionally (D) initiators,
optionally (E) accelerators,
optionally (F) inhibitors, and
optionally (G) further constituents,
with the proviso that the content of fillers (B) in the composition (M) is at least 85% by weight and that component (B) consists at least in part of coarse-grained fillers with grain sizes of from 0.2 mm to 10 mm.

The content of components (A) to (G) in the composition (M) according to the invention is preferably from 95 to 100% by weight. In particular, the compositions (M) do not contain any further constituents apart from the constituents (A) to (G).

The compositions (M) according to the invention can be produced by known methods, such as, for example, by simple mechanical mixing of the individual components (A) to (G) in any desired sequence. Depending on the consistency and viscosity of the mixture, the mixing process can be carried out in roller mills, kneaders, dissolvers, ribbon mixers, such as pan mixers, turbine pan-type mixers, planetary mixers, drum mixers, twin-shaft batch mixers or simple stirring units.

The present invention further provides a method for producing the compositions (M) according to the invention by mixing the individual components in any desired sequence.

In the production of the compositions (M) according to the invention, the fillers (B) are preferably first placed in a suitable mixing unit and optionally mixed together with component (G). Organosilicon compounds (A) and optionally components (C) to (F) are then added.

In a further preferred embodiment for producing the compositions (M) according to the invention, the organosilicon compounds (A) are placed in a vessel and then mixed with fillers (B) and subsequently optionally with components (C) to (G).

In the above-mentioned production methods, the organosilicon compounds (A) and optionally components (C) to (F) can be used each individually or in the form of a premix (V).

If different coarse-grained and optionally finely divided fillers (B) are used in the above-mentioned production methods, the sequence of addition most preferably takes place according to grain size, that is to say the coarser-grained fillers (B) are first placed in a vessel in turn and then mixed with the more finely divided fillers (B).

The production of the mixture (M) can take place batchwise, semi-continuously or continuously.

Mixing can take place at room temperature and at the pressure of the surrounding atmosphere, that is to say approximately from 900 to 1100 hPa. If desired, however, the mixing can also take place at higher temperatures, for example at temperatures in the range of from 30 to 150° C. It is further possible to mix under reduced pressure, such as, for example, at from 30 to 500 hPa absolute pressure, temporarily or constantly, in order to remove volatile compounds and/or air.

In a preferred embodiment, the compositions (M) according to the invention are kneadable mixtures of putty-like consistency which are very highly viscous at room temperature but can, however, be made to flow under correspondingly high mechanical pressure.

In a further preferred embodiment, the compositions (M) according to the invention have the consistency of wet sand. They are conveyable, for example on conveyor belts, and are sufficiently stable for storage until further processing.

The compositions (M) according to the invention can be brought into any desired shape by mechanical pressure at ambient temperature or optionally at elevated temperature.

The compositions (M) according to the invention can be allowed to crosslink under the same conditions as crosslinkable compositions based on organosilicon compounds known hitherto.

The organosilicon compounds (A) used according to the invention can be any desired types of organosilicon compounds known hitherto in principle, such as, for example, organosilicon compounds crosslinkable by condensation reaction, organosilicon compounds crosslinkable by addition reaction, peroxidically crosslinkable organosilicon compounds as well as radiation-crosslinkable organosilicon compounds.

The organosilicon compounds (A) used according to the invention are preferably organosilicon compounds crosslinkable by condensation reaction or organosilicon compounds crosslinkable by addition reaction.

Examples of further constituents (G) which are optionally used are pigments, odorous substances, oxidation inhibitors, agents for influencing the electrical properties, such as conductive black, flameproofing agents, any further substances hitherto known in crosslinkable compositions, such as functional silanes, such as methacrylsilanes, glycidoxysilanes and mercaptosilanes; silicates, such as sodium orthosilicate, disodium disilicate, disodium trisilicate, potassium silicate, calcium silicate and magnesium silicate; water, also adsorbed, for example on zeolites, cyclodextrins or in the form of water of crystallization bound in salts, such as sodium sulfate decahydrate, aluminum sulfate octadecahydrate, calcium sulfate dihydrate, disodium metasilicate nonahydrate and disodium metasilicate pentahydrate.

Examples of pigments (G) which are optionally used are inorganic pigments such as iron oxides (yellow, black, red), chromium(III) oxide, titanium dioxide and carbon black; dyes, such as phthalocyanines and azo compounds; effect pigments for producing a metallic effect, such as platelets of gold, silver, copper, aluminum, silicon, mica, optionally coated with, for example, $FeTiO_3$, $Fe_2O_3$, $TiO_2$, or liquid crystal pigments for producing a goniochromatic color effect. The pigments can be used in powder form or in dispersion in a suitable liquid, preferably in a liquid component contained in the mixture (M). The pigments can further be used applied to the coarse-grained fillers as a surface coating.

If the compositions (M) according to the invention comprise component (G), the amounts in question are preferably from 1 to 30 parts by weight, particularly preferably from 1 to 20 parts by weight, in particular from 1 to 10 parts by weight, in each case based on 100 parts by weight of organosilicon compounds (A).

Compositions (M-1) Crosslinkable by Condensation Reaction

In a preferred embodiment of the present invention, the compositions (M) according to the invention are preferably compositions (M-1) which comprise organosilicon compounds (A1) crosslinkable by condensation reaction. Such organosilicon compounds (A1) are generally characterized in that they comprise Si-bonded hydroxy and/or organyloxy groups, wherein water and/or the corresponding alcohol is freed during the crosslinking.

The compositions (M-1) according to the invention are preferably those consisting substantially of (A-1) 100 parts by weight of at least one organosilicon compound containing groups capable of condensation, (B) from 900 to 2400 parts by weight of at least one filler, optionally (C-1) condensation catalysts, and optionally (G) further constituents, with the proviso that the content of fillers (B) in the composition (M-1) is at least 85% by weight and that component (B) consists at least in part of coarse-grained fillers with grain sizes of from 0.2 mm to 10 mm.

Within the scope of the present invention, radicals "capable of condensation" is to be understood as meaning also radicals that also include an optional preceding hydrolysis step.

The organosilicon compounds (A-1) that crosslink by condensation reaction in the compositions (M-1) can be any such compounds known in the prior art. (A-1) is preferably composed of compounds having organopolysiloxanes comprising at least 0.05% by weight hydroxy group and from 0 to 15% by weight alkoxy groups.

Examples of component (A-1) are substantially linear polydiorganosiloxanes having from 5 to 50 silicon atoms per molecule, which are obtainable by hydrolysis of diorganyldichlorosilanes with an excess of water. Further examples of component (A-1) are star-shaped polyorganosiloxanes having from 10 to 100 silicon atoms per molecule, which are obtainable by hydrolysis of mixtures of diorganyldichlorosilanes with up to 5 mol % organyltrichlorosilanes and/or tetrachlorosilane with an excess of water.

Examples of organosilicon compounds (A-1) are OH-terminated linear polydimethylsiloxanes having an average chain length of from 5 to 50 siloxy units, for example corresponding to the formula $HO-(Me_2SiO)_5-H$, and star-shaped polydimethylsiloxanes, for example corresponding to the formula $[HO-(Me_2SiO)_{10}]_3SiMe$ or $[HO-(Me_2SiO)_{10}]_4Si$.

Further examples of component (A-1) are organylethoxypolysiloxanes having from 5 to 25 silicon atoms per molecule, which are obtainable by partial hydrolysis of one or more organyltriethoxysilanes with water. These compounds are preferably liquid. Instead of organyltriethoxysilanes, organyltrimethoxysilanes can also be used for the preparation, whereby organylmethoxypolysiloxanes are then obtainable. An example of such a compound is $(MeSiO_{3/2})_{0.37}(Me(EtO)SiO_{2/2})_{0.46}(MeSi(EtO)_2SiO_{1/2})_{0.17}$ with Mw=2400 g/mol, Mn=900 g/mol and Mw/Mn=2.7.

Further examples of component (A-1) are compounds having from 5 to 25 silicon atoms per molecule, which are obtainable by partial hydrolysis of tetraethoxysilanes or tetramethoxysilane with water. An example of such a compound is $Si(OEt)_2O_{2/2})_{0.42}(Si(OEt)O_{3/2})_{0.19}(Si(OEt)_3O_{1/2})_{0.39}$ with Mw=1000 g/mol, Mn=800 g/mol and Mw/Mn=1.2.

Further examples of component (A-1) are organylsilsequioxanes having on average at least 40 silicon atoms per molecule, which are obtainable by hydrolysis of organylethoxychlorosilanes with water. These compounds are preferably solid. Instead of organylethoxychlorosilanes, organylmethoxychlorosilanes can be used for the preparation. In this manner there is obtainable, for example, a compound of the formula $(MeSiO_{3/2})_{0.88}(MeSi(OH)O_{2/2})_{0.05}(MeSi(OEt)O_{2/2})_{0.06}(Me_2SiO_{2/2})_{0.01}$ with Mw=6600 g/mol, Mn=2000 g/mol and Mw/Mn=3.3.

The organyl radicals in component (A-1) are preferably methyl, ethyl, n-propyl, vinyl, 2,4,4-trimethylpentyl, n-octyl, phenyl or hexadecyl radicals.

Further examples of component (A-1) are organyltriethoxysilanes or organyltrimethoxysilanes, such as, for example, n-octyltrimethoxysilane, n-octyltriethoxysilane, (2,4,4-trimethylpentyl)trimethoxysilane, (2,4,4-trimethylpentyl)triethoxysilane, n-hexadecyltrimethoxysilane, n-hexadecyltriethoxysilane, n-nonacosyltriethoxysilane, n-nonacosyltrimethoxysilane, n-triacontyltrimethoxysilane, n-triacontyltriethoxysilane, cyclohexyltrimethoxysilane and cyclohexyltriethoxysilane. Moreover, diorganyldiethoxysilanes or diorganyldimethoxysilanes can be used. Examples are n-octylmethyldimethoxysilane, n-octylmethyldiethoxysilane, (2,4,4-trimethylpentyl)methyldimethoxysilane, (2,4,4-trimethylpentyl)-methyldiethoxysilane, n-hexadecylmethyldimethoxysilane, n-hexadecylmethyldiethoxysilane, (cyclohexyl)methyldimethoxysilane or (cyclohexyl)methyldiethoxysilane.

If organosilicon compound (A-1) is used in the form of a premix (V-1), the premix (V-1) preferably has a dynamic viscosity of less than 1000 mPa·s at 80° C.

The organosilicon compound (A-1) crosslinking by condensation reaction can be a single organosilicon compound or mixtures of a plurality of organosilicon compounds, such as, for example, siloxanes having groups capable of condensation, and silane crosslinkers.

There is most preferably used as component (A-1) a mixture of a silicone resin that is solid at 20° C. with an organyl-silane and/or organyl-siloxane that is liquid at 20° C.

There can be used as condensation catalysts (C-1) any catalysts already known hitherto for condensation reaction, that is to say Lewis and Brønstedt acids and bases, whereby metal-containing Lewis acids and non-metal-containing Brønstedt bases are preferred.

Examples of catalysts (C-1) which are optionally used are diorganotin compounds such as dioctyltin dilaurate, bismuth (III) neodecanoate, tin(II) octoate, potassium siliconate, lithium hydroxide, sodium hydroxide, potassium hydroxide, calcium hydroxide, lithium methanolate, sodium methanolate, potassium methanolate, magnesium methanolate, calcium methanolate, lithium ethanolate, sodium ethanolate, potassium ethanolate, magnesium ethanolate, calcium ethanolate, 1,8-diazabicyclo[5.4.0]undec-7-ene, 3-aminopropyltriethoxysilane, 3-(2-aminoethyl)aminopropylmethyldimethoxysilane, 1,5,7-triazabicyclo[4.4.0]dec-5-ene, 7-methyl-1,5,7-triazabicyclo[4.4.0]dec-5-ene and N,N,N',N'-tetramethylguanidine.

If condensation catalysts (C-1) are used, they are preferably used in amounts of from 0.01 to 0.5 part by weight in the case of the non-metal-containing Brønstedt bases and in amounts of from 0.5 to 10 parts by weight in the case of the metal-containing Lewis acids, in each case based on 100 parts by weight of component (A-1).

Compositions (M-2) Crosslinking by Addition Reaction

In a further preferred embodiment of the present invention, the compositions (M) according to the invention are preferably compositions (M-2) which comprise organosilicon compounds (A-2) crosslinkable by addition reaction. These compositions (M-2) are generally characterized in that they comprise organosilicon compounds (A-2) having groups capable of hydrosilylation reaction, preferably organosilicon compounds which contain SiC-bonded radicals with aliphatic carbon-carbon multiple bonds, organosilicon compounds with Si-bonded hydrogen atoms, and/or organosilicon compounds which contain both SiC-bonded radicals with aliphatic carbon-carbon multiple bonds and Si-bonded hydrogen atoms.

The compositions (M-2) according to the invention are preferably those consisting substantially of (A-2) 100 parts by weight of at least one crosslinkable organosilicon compound selected from the group consisting of organosilicon compounds (A-2-1) which contain SiC-bonded radicals with aliphatic carbon-carbon multiple bonds, organosilicon compounds (A-2-2) with Si-bonded hydrogen atoms, and organosilicon compounds (A-2-3) which contain SiC-bonded radicals with aliphatic carbon-carbon multiple bonds and Si-bonded hydrogen atoms, with a molar ratio Si—H to SiC-bonded radicals with aliphatic carbon-carbon multiple bonds of preferably from 0.5:1 to 2:1, (B) from 900 to 2400 parts by weight of at least one filler, (C-2) catalysts that promote the addition of Si-bonded hydrogen to aliphatic multiple bond, optionally (F-2) inhibitors, and optionally (G-2) further constituents, with the proviso that the content of fillers (B) in the composition (M-2) is at least 85% by weight and that component (B) consists at least in part of coarse-grained fillers with grain sizes of from 0.2 mm to 10 mm.

The radicals with aliphatic carbon-carbon multiple bonds contained in component (A-2) are preferably SiC-bonded alkenyl groups, preferably vinyl or allyl groups.

Organosilicon compounds (A-2) are in particular either silicone resins which can be prepared by reaction of the corresponding chlorosilanes, preferably selected from methyltrichlorosilane, phenyltrichlorosilane, phenyldichlorosilane, vinyltrichlorosilane, phenylmethyldichlorosilane, dimethyldichlorosilane, methyldichlorosilane, vinylmethyldichlorosilane, vinyldichlorosilane, dimethylchlorosilane, vinyldimethylchlorosilane, trimethylchlorosilane and/or tetrachlorosilane, dissolved in toluene, with a deficient amount of alcohol, based on the number of Si—Cl bonds, wherein HCl escapes at least in part, and subsequent reaction with an excess of water, based on the sum of the Si—Cl and Si-alkoxy bonds, and subsequent separation of the aqueous and organic phase as well as separation of the toluene and alcohol from the organic phase; or silicon compounds which can be prepared by reaction of the above-mentioned chlorosilanes, alone or in a mixture with one another, with the corresponding alcohol (alcoholysis) in stoichiometric excess and optionally water (hydrolysis, condensation) in a substoichiometric amount, based on Si—Cl bonds originally present. Methanol or ethanol is preferably used as the alcohol. In component (A-2), the molar ratio Si—H:Si-alkenyl, preferably SiH:Si-vinyl, is preferably from 0.55:1 to 1.8:1, more preferably from 0.6:1 to 1.5:1, and in particular from 0.95:1 to 1.05:1. The relative proportions of the chlorosilanes required for the synthesis of the above-mentioned substances must therefore be so chosen that those ratios are observed.

Examples of the catalysts (C-2) in the compositions (M) crosslinkable by addition reaction are any hydrosilylation catalysts known hitherto based on nickel, iron, platinum, rhodium, iridium, palladium, ruthenium or osmium, preferably a metal from the group of the platinum metals or a compound or a complex from the group of the platinum metals, such as, for example, metallic and finely divided platinum, which can be on supports, such as silicon dioxide, aluminum dioxide or active carbon; platinum halides, for example $PtCl_4$, $OH_2PtCl_6.6H_2O$, $Na_2PtCl_4.4H_2O$; platinum-olefin complexes; platinum-vinylsiloxane complexes, such as platinum-1,3-divinyl-1,1,3,3-tetramethyldisiloxane. There is preferably used as the catalyst (C-2) Karstedt's catalyst, which has long been known in the literature (U.S. Pat. No. 3,775,452).

The compositions (M-2) according to the invention preferably comprise catalysts (C-2) in amounts of from 0.0001 to 0.1000 part by weight, more preferably from 0.0001 to 0.05 part by weight, and in particular from 0.0001 to 0.01 part by weight, in each case based on the net weight of the metal in the compound, that is to say without taking into consideration ligands, counter-ions or the like, and based on 100 parts by weight of organosilicon compound (A-2).

Examples of inhibitors (F-2) which are optionally used, which retard the addition of Si-bonded hydrogen to aliphatic multiple bonds, are any inhibitors known hitherto in compositions crosslinkable by addition reaction, such as 1,3-divinyl-1,1,3,3-tetramethyldisiloxane, benzotriazole, diallyl formamides, alkylthioureas, thiuram monosulfides and disulfides, methyl ethyl ketoxime, organic or organosilicon compounds having a boiling point of at least 25° C. at 1013 mbar and at least one aliphatic triple bond, such as 1-ethynylcyclohexan-1-ol, 2-methyl-3-butyn-2-ol, 3-methyl-1-pentyn-3-ol, 2,5-dimethyl-3-hexyn-2,5-diol, 2,5-dimethyl-1-hexyn-3-ol, 3,7-dimethyloct-1-yn-6-en-3-ol, a mixture of diallyl maleate and vinyl acetate, maleic acid monoesters, and inhibitors such as the compound of the formula $HC\equiv C-C(CH_3)(OH)-(CH_2)_2-CH=C(CH_3)_2$, which is available commercially from BASF SE under the trade name "Dehydrolinalool".

If the compositions (M-2) according to the invention comprise component (F-2), the amounts in question are preferably from 0.0001 to 1 part by weight, more preferably from 0.0001 to 0.5 part by weight, and in particular from 0.0001 to 0.1 part by weight, in each case based on 100 parts by weight of organosilicon compound (A-2).

The addition of water as a further constituent (G) is not preferred, either as such, or bound in the form of water of crystallization or adsorbed or in the form of water-eliminating compounds.

The compositions (M-2) according to the invention are most preferably those consisting substantially of
(A-2) 100 parts by weight of at least one crosslinkable organosilicon compound (A-2) composed of an organosilicon compound (A-2-1) comprising Si-vinyl groups and an organosilicon compound (A-2-2) comprising Si—H groups, in a ratio such that the molar ratio of Si—H:Si-vinyl groups in component (A-2), in total, is from 0.95:1 to 1.05:1,
(B) from 900 to 2400 parts by weight of quartz from natural sources, in the form of a mixture of a finely divided grain with a grain size of from 0.02 to 200 μm and a coarsely divided grain with a grain size of from 0.2 mm to 10 mm and a mixing ratio, based on the weight of the fillers, of finely divided granularity to coarsely divided granularity of from 4:1 to 1:4,
(C-2) from 0.0001 to 0.005 part by weight of platinum in the form of Karstedt's catalyst,
(F-2) from 0.001 to 1 part by weight of inhibitors selected from tetramethylthiuram monosulfide and 1-ethynylcyclohexan-1-ol, and
(G-2) from 0.01 to 10 parts by weight of further constituents.

In a further particularly preferred embodiment, the compositions (M-2) according to the invention are those consisting substantially of
(A-2) 100 parts by weight of at least one crosslinkable organosilicon compound (A-2) composed of an organosilicon compound (A-2-3) comprising Si-vinyl and Si—H groups and optionally an organosilicon compound (A-2-2) comprising Si—H groups and/or an organosilicon compound (A-2-1) comprising Si-vinyl groups, in a ratio such that the molar ratio of Si—H:Si-vinyl groups in component (A-2), in total, is from 0.95:1 to 1.05:1,
(B) from 900 to 2400 parts by weight of quartz from natural sources, in the form of a mixture of a finely divided grain with a grain size of from 0.02 to 200 μm and a coarsely divided grain with a grain size of from 0.2 mm to 10 mm and a mixing ratio, based on the weight of the fillers, of finely divided grain to coarsely divided grain of from 4:1 to 1:4,
(C-2) from 0.0001 to 0.005 part by weight of platinum in the form of Karstedt's catalyst,
(F-2) from 0.001 to 1 part by weight of inhibitor selected from tetramethylthiuram monosulfide and 1-ethynylcyclohexan-1-ol, and (G-2) from 0.01 to 10 parts by weight of further constituents.

Radically Crosslinking Compositions (M-3)

If the composition (M) according to the invention is a composition (M-3) which comprises radically crosslinkable organosilicon compounds (A-3), component (A-3) is generally characterized in that it comprises Si-bonded mono- or poly-unsaturated alkenyl groups capable of radical reaction, preferably vinyl or allyl groups, and/or Si-bonded, optionally substituted hydrocarbon radicals.

The compositions (M-3) according to the invention are preferably those consisting substantially of
(A-3) 100 parts by weight of at least one crosslinkable organosilicon compound selected from the group consisting of organosilicon compounds which contain SiC-bonded phenyl and/or SiC-bonded methyl and/or SiC-bonded vinyl or allyl radicals, whereby the organosilicon compounds are composed substantially of linear organopolysiloxane units and/or substantially of branched organopolysiloxane units with a resin structure,
(B) from 900 to 2400 parts by weight of at least one filler, optionally (D-3) initiators,
optionally (E-3) accelerators, and
optionally (G-3) further constituents,
with the proviso that the content of fillers (B) in the composition (M-3) is at least 85% by weight and that component (B) consists at least in part of coarse-grained fillers with grain sizes of from 0.2 mm to 10 mm.

Organosilicon compounds (A-3) are in particular either silicone resins which can be prepared by reaction of the corresponding chlorosilanes, preferably methyltrichlorosilane, phenyltrichlorosilane, phenylmethyldichlorosilane, dimethyldichlorosilane, vinyltrichlorosilane, vinylmethyldichlorosilane, allylmethyldichlorosilane, trimethylchlorosilane and/or tetrachlorosilane, dissolved in toluene, with a deficient amount of alcohol, based on the number of Si—Cl bonds, wherein HCl escapes at least in part, and subsequent reaction with an excess of water, based on the sum of the Si—Cl and Si-alkoxy bonds, and subsequent separation of the aqueous and organic phase as well as separation of the toluene and alcohol from the organic phase; or silicon compounds which can be prepared by reaction of the above-mentioned chlorosilanes, alone or in a mixture with one another, with the corresponding alcohol (alcoholysis) in stoichiometric excess and optionally water (hydrolysis, condensation) in a substoichiometric amount, based on Si—Cl bonds originally present. Methanol or ethanol is preferably used as the alcohol.

Examples of initiators (D-3) which are optionally used are any initiators known hitherto in radically crosslinkable compositions which provide free radicals.

The initiators (D-3) which are optionally used are preferably peroxides, such as methyl ethyl ketone peroxide, methyl isobutyl ketone peroxide, 2,4-pentanedione peroxide, acetylacetone peroxide, di-tert-butyl peroxide, dicumyl peroxide, benzoyl peroxide, tert-butyl peroxyacetate, tert-butyl peroxybenzoate, tert-butyl peroxy-2-ethylhexanoate, dilauroyl peroxide; and peroxodicarbonates, such as sodium peroxydicarbonate or bis(4-tert-butylcyclohexyl) peroxydicarbonate.

If the compositions (M-3) according to the invention comprise component (D-3), the amounts in question are preferably from 0.1 to 5 parts by weight, more preferably from 0.5 to 3 parts by weight, in each case based on 100 parts by weight of organosilicon compound (A-3).

The accelerators (E-3) which are optionally used are preferably cobalt(II) octoate, cobalt(II) 2-ethylhexanoate, copper(II) acetate, copper(I) chloride, manganese(II) acetate.$4H_2O$, barium bis(2-ethylhexanoate), dimethylaniline, diethylaniline, vanadium(V) oxide, 2,4-pentadienone, N,N-diethylacetoacetamide, diethyl acetoacetamide, dimethylparatoluidine, N,N,4-trimethylaniline and/or mixtures thereof, which are optionally dissolved, for example, in xylene and/or white spirit or mixtures thereof.

If the compositions (M-3) according to the invention comprise component (E-3), the amounts used are preferably from 0.001 to 5 parts by weight, more preferably from 0.001 to 1, and in particular from 0.01 to 1, in each case based on 100 parts by weight of organosilicon compound (A-3).

In a further embodiment, the radicals necessary for radical curing of the radically crosslinkable organosilicon compounds (A-3) contained in the compositions (M-3) can also be generated by electron beams. Such compositions preferably do not comprise initiators (D) or accelerators (E).

Each of the components used for the production of the crosslinkable compositions (M) according to the invention can be a single type of such a component as well as a mixture of at least two different types of such a component.

In the method according to the invention, the shaping of the compositions (M) according to the invention can take place, for example, by the method of injection molding, which has long been known per se. To that end, the composition (M) is injected preferably by means of mechanical pressure into a corresponding mold cavity. The mold is preferably in two parts and is closed during the injection molding operation by a hydraulic press. The mold is preferably preheated to the desired temperature, whereby on the one hand flowing of the composition is facilitated and on the other hand curing is accelerated. At the end of the injection molding operation, the mold is preferably kept closed until the molded bodies have reached a consistency that allows them to be removed without being damaged. Mold cavities for test specimens are described, for example, in DIN EN ISO 10724-1:2002-04.

The present invention further provides molded bodies produced by crosslinking the compositions (M) according to the invention or produced according to the invention. The molded bodies according to the invention are preferably artificial stone.

The molded bodies according to the invention preferably have a hardness of preferably at least 50 Shore D, more preferably at least 60 Shore D, and in particular at least 75 Shore D.

The molded bodies according to the invention do not exhibit any color change (yellowing of light color shades or lightening of dark color shades) under the action of UV radiation as compared with conventional molded bodies based on organic resins, when significant changes are already visible in the case of the conventional systems.

The compositions according to the invention further have the advantage that they are outstandingly suitable for the production of artificial stone.

The compositions according to the invention have the advantage that no harmful emissions into the environment occur during processing, as is usually the case with polyester resins used according to the prior art, which are dissolved in styrene.

The method according to the invention has the advantage that it is simple to carry out.

The molded bodies according to the invention have the advantage that they have excellent heat resistance so that, under a higher thermal load of up to 200° C., lesser or no discolorations occur than is the case with molded bodies that are produced according to the current prior art using organic polyester or acrylate resins. Moreover, the mechanical properties are largely retained even after prolonged thermal load at very high temperatures (e.g. 1 hour at 700° C.)

The molded bodies according to the invention have the advantage that they are stable to UV and to weathering.

The molded bodies according to the invention have the advantage that they remain dimensionally stable under high thermal load and there is accordingly no risk of hot and/or burning solid and/or liquid material peeling off.

In the examples described below, all viscosity data, unless otherwise indicated, relate to a temperature of 25° C. Unless otherwise indicated, the following examples are carried out at a pressure of the ambient atmosphere, that is to say approximately at 1013 hPa, and at room temperature, that is to say at approximately 23° C., or at a temperature which is established when the reactants are combined at room temperature without additional heating or cooling, and at a relative humidity of approximately 50%. Furthermore, all data relating to parts and percentages, unless otherwise indicated, are based on weight.

In the present invention, substances are characterized by indicating data that are preferably obtained by means of instrumental analysis. The underlying measurements are either carried out following publicly available standards or are determined by specially developed methods. In order to ensure the clarity of the teaching that is imparted, the methods used are described here:

Viscosity

In the following examples, the dynamic viscosity of the organosilicon compounds is measured in accordance with DIN 53019. The procedure was preferably as follows: Unless otherwise indicated, the viscosity is measured at 25° C. by means of a "Physica MCR 300" rotational rheometer from Anton Paar. For viscosities from 10 to 200 mPa·s, a coaxial cylinder measuring system (CC 27) with an annular measuring gap of 1.13 mm is used, and for viscosities greater than 200 mPa·s, a cone/plate measuring system (Searle-System with measuring cone CP 50-1) is used. The shear speed is matched to the polymer viscosity (1 to 99 mPa·s at 100 s$^{-1}$; 100 to 999 mPa·s at 200 s$^{-1}$; 1000 to 2999 mPa·s at 120 s$^{-1}$; 3000 to 4999 mPa·s at 80 s$^{-1}$; 5000 to 9999 mPa·s at 62 s$^{-1}$; 10,000 to 12,499 mPa·s at 50 s$^{-1}$; 12,500 to 15,999 mPa·s at 38.5 s$^{-1}$; 16,000 to 19,999 mPa·s at 33 s$^{-1}$; 20,000 to 24,999 mPa·s at 25 s$^{-1}$; 25,000 to 29,999 mPa·s at 20 s$^{-1}$; 30,000 to 39,999 mPa·s at 17 s$^{-1}$; 40,000 to 59,999 mPa·s at 10 s$^{-1}$; 60,000 to 149,999 at 5 s$^{-1}$; 150,000 to 199,999 mPa·s at 3.3 s$^{-1}$; 200,000 to 299,999 mPa·s at 2.5 s$^{-1}$; 300,000 to 1,000,000 mPa·s at 1.5 s$^{-1}$.

After the measuring system has been adjusted to the measuring temperature, a three-stage measuring program consisting of a run-in phase, a pre-shear and a viscosity measurement is applied. The run-in phase is carried out by increasing the shear speed stepwise within one minute to the shear speed indicated above, which is dependent on the viscosity to be expected and at which the measurement is to be carried out. As soon as that shear speed is reached, pre-shear takes place at a constant shear rate for 30 seconds and then, for determining the viscosity, 25 individual measurements are carried out for in each case 4.8 seconds, from which the mean is determined. The mean corresponds to the dynamic viscosity, which is given in mPa·s.

Description of the Determination of the Molecular Weight Distributions

Method: Size exclusion chromatography (SEC) in accordance with DIN 55672-1

Flow rate: 1.00 ml/min

Injection system: Agilent 1200 autosampler (Agilent Technologies)

Injection volume: 100 µl

Eluent: In the case of products comprising phenyl groups, tetrahydrofuran >99.5%, stabilized with 250 ppm of 2,6-di-tert-butyl-4-methylphenol (BHT), was used; in the case of materials not comprising phenyl groups, toluene >99.9%, p.A., was used. All the chemicals are obtainable commercially, for example from Merck KGaA, D-Darmstadt.

Column: Stationary phase: polystyrene-divinylbenzene from Agilent Technologies

Four columns were connected in series, consisting of a pre-column having a length of 50 mm and three separating columns each having a length of 300 mm. All the columns had an inside diameter of 7.8 mm. The gels used had a particle size of 5 µm. The pore size of the pre-column was 500 Å, that of the three separating columns was, in order, 10,000 Å, 500 Å and 100 Å.

Column temperature: Oven temperature 45° C. The concentration was determined with an RI detector (measuring principle deflection, type: Agilent 1200; cell volume: 8 µl; temperature: 45° C.

The system was calibrated with polystyrene standards likewise obtainable commercially from Agilent. Concentration: 0.4 g/l EasiCal, ready-for-use polystyrene calibrating agent; injection volume: 100 µl. As internal standard for toluene as eluent, tetrahydrofuran was used as marker substance, and as internal standard for tetrahydrofuran as eluent, toluene was used as marker substance. Adaptation of calibration curves: third order polynomial fit PSS. Sample preparation: Approximately 15 to 50 mg of the sample to be measured were dissolved in the respective eluent (c=approximately 3-10 mg/ml). The amount of sample was such that a clear RI signal could be obtained. All the samples could be dissolved completely in the eluent.

Evaluation: The determined molar weights were in each case rounded to whole hundreds.

Flexural Strength

In the present invention, the flexural strength was measured in accordance with DIN EN 14617-2:2008-11 at a support distance of 180 mm.

The procedure was as follows: Three test specimens of dimensions length×width×thickness=200 mm×50 mm×10 mm were used. The measurements were each carried out on 3 test specimens. The test specimens were produced as indicated in the examples and cured under the conditions (temperature, time) indicated in the examples. In the test, the test specimens were always inserted into the machine in the same manner as they were positioned in the injection mold, that is to say with the bottom side downwards. Before the measurement, the test specimens were conditioned at 23° C. and 50% relative humidity for 24 hours. The value given for the flexural strength in MPa corresponds in each case to the mean of the individual measurements, rounded to 0.1 MPa in accordance with DIN 1333:1992-02 Section 4.5.

Shore D Hardness

The measurement of the hardness was determined in accordance with DIN EN ISO 868:2003-10. The procedure was preferably as follows: The measurement was carried out using a durometer (Shore D hardness) on test specimens in sheet form of dimensions length×width×thickness=40 mm×40 mm×6 mm, which test specimens were produced by injection molding methods using a tool having exchangeable mold cavity plates in accordance with DIN EN ISO 10724-1:2002-04 Form 2 and cured under the conditions (temperature, time) indicated in the examples. Before the measurement, the test specimens were preliminarily stored at 23° C. and 50% relative humidity for the time indicated in the examples.

Example 1

100 parts by weight of a pulverulent organosilicon compound having a mean molecular weight Mw of 6600 g/mol, a mean molecular weight Mn of 2000 g/mol and a polydispersity of 3.3, of the average formula $(MeSiO_{3/2})_{0.88}(MeSi(OH)O_{2/2})_{0.05}(MeSi(OEt)O_{2/2})_{0.06}(Me_2SiO_{2/2})_{0.01}$, 65 parts by weight of an organosilicon compound having the average composition $(MeSiO_{3/2})_{0.19}(i\text{-}OctSiO_{3/2})_{0.05}(MeSi(OMe)O_{2/2})_{0.30}(i\text{-}OctSi(OMe)O_{2/2})_{0.08}\text{-}(MeSi(OMe)_2O_{1/2})_{0.16}(i\text{-}OctSi(OMe)_2O_{1/2})_{0.07}(Me_2SiO_{2/2})_{0.15}$ having a mean molecular weight Mw of 1550 g/mol, a mean molecular weight Mn of 550 g/mol and a polydispersity of 2.8 were placed in a round-bottomed flask. The mixture was then heated to 55° C., with stirring, whereby a homogeneous mixture formed. The temperature of the mixture was then increased to 95° C. and, when that temperature had been reached, a pressure of 100 mbar was applied. Stirring was carried out for a further 2.5 hours under those conditions, following which the mixture was allowed to cool at a pressure of 100 mbar to a temperature of 23° C. before the vacuum was broken. The resin mixture so obtained had a dynamic viscosity of 6000 mPa·s at 25° C. and a dynamic viscosity of 200 mPa·s at 80° C.

150 parts by weight of coarse-grained quartz of type "Quartz gravel SB 2-3.2 T" with a grain size of from 2 mm to 3.2 mm, 200 parts by weight of coarse-grained quartz of type "Quartz sand SB 0.7-1.2 T" with a grain size of from 0.7 mm to 1.2 mm, 300 parts by weight of coarse-grained quartz of type "Quartz sand SB 0.3-0.9 T" with a grain size of from 0.3 mm to 0.9 mm, all three available commercially from Amberger Kaolinwerke Eduard Kick GmbH & Co. KG of D-Hirschau, and 350 parts by weight of finely divided quartz powder with an upper grain size $d_{95\%}$ of 50 µm and a mean grain size $d_{50\%}$ of 16 µm of type "Millisil W12"

(available commercially from Quarzwerke GmbH, D-Frechen) were placed in a drum mixer and mixed for 1 minute. 100 parts by weight of the above-described resin mixture, adjusted to a temperature of 23° C., were then added, and mixing was carried out for a further 10 minutes. 0.8 part by weight of a solution of 0.4 part by weight of N,N,N',N'-tetramethylguanidine in 0.4 part by weight of 2,4,4-trimethylpentyltrimethoxysilane was then added, and mixing was again carried out for 5 minutes. This mixture had a consistency similar to wet sand. This mixture was introduced into a mold cavity made of stainless steel of dimensions length×width×height=220 mm×170 mm×15 mm. The composition was predensified in the mold on a vibrating table at a frequency of 50 Hz within a period of 2 minutes. The mold was then mounted in a hydraulic press and air was removed from the mold cavity, together with the composition, by application of a low pressure of 250 mbar. The mold was then densified with a press force of 150 kN. This corresponds to a pressure, based on the surface of the test plate to be produced, of 4000 kPa. The mold was then stored in an oven for 4 hours at 150° C. After cooling to room temperature, the molded body was removed from the mold. Test specimens of dimensions length×width×height=200 mm×50 mm×10 mm were cut from the molded body. The flexural strength of the test specimens was measured in accordance with DIN EN 14617-2:2008-11. A value for the flexural strength of 14.3 MPa was obtained.

Example 2

10.5 parts by weight of an organosilicon compound having the composition $(Me_3SiO_{1/2})_2(Me(H)SiO_{2/2})_{35}$ were first mixed with 10.0 parts by weight of an organosilicon compound of the formula $[MeViSiO_{2/2}]_4$ and 4.5 parts by weight of an organosilicon compound of the formula $[MeViSiO_{2/2}]_5$.

250 parts by weight of coarse-grained quartz of type "Quartz sand SB 0.7-1.2 T" with a grain size of from 0.7 mm to 1.2 mm, 400 parts by weight of coarse-grained quartz of type "Quartz sand SB 0.3-0.9 T" with a grain size of from 0.3 mm to 0.9 mm (both available commercially from Amberger Kaolinwerke Eduard Kick GmbH & Co. KG of D-Hirschau) and 350 parts by weight of finely divided quartz powder with an upper grain size $d_{95\%}$ of 50 μm and a mean grain size $d_{50\%}$ of 16 μm of type "Millisil W12" (available commercially from Quarzwerke GmbH, D-Frechen) were placed in a drum mixer and mixed for 1 minute. 100 parts by weight of the above-described mixture of the organosilicon compound, adjusted to 23° C., were then added, and mixing was carried out for a further 10 minutes. 2.026 parts by weight of a mixture of 0.026 part by weight of a Karstedt catalyst having a platinum content of 19% by weight and 2 parts by weight of organosilicon compound of the formula $[MeViSiO_{2/2}]_4$ were then added, and mixing was again carried out for 5 minutes. This mixture had a consistency similar to wet sand. This mixture was introduced into a mold cavity made of stainless steel of dimensions length×width×height=220 mm×170 mm×15 mm. The composition was predensified in the mold on a vibrating table at a frequency of 50 Hz within a period of 2 minutes. The mold was then mounted in a hydraulic press and air was removed from the mold cavity, together with the composition, by application of a low pressure of 250 mbar. The mold was then densified with a press force of 150 kN. This corresponds to a pressure, based on the surface of the test plate to be produced, of 4000 kPa. The mold was then stored in an oven for 2 hours at 150° C. After cooling to room temperature, the molded body was removed from the mold. Test specimens of dimensions length×width× height=200 mm×50 mm×10 mm were cut from the molded body. The flexural strength of the test specimens was measured in accordance with DIN EN 14617-2:2008-11. A value for the flexural strength of 15.8 MPa was obtained.

Example 3

The procedure described in Example 2 was repeated except that, instead of 350 parts by weight of finely divided quartz powder of type "Millisil W12", only 250 parts by weight of finely divided quartz powder of type "Millisil W12" and 100 parts by weight of a finely divided wollastonite powder coated with vinyldimethylchlorosilane of type "Tremin 939-100 VST" with a needle length of from 5 μm to 150 μm and a mean length-to-diameter ratio of 7 to 1 (both available commercially from Quarzwerke GmbH, D-Frechen) were used. A value for the flexural strength of 17.0 MPa was determined.

The invention claimed is:

1. A crosslinkable composition (M) comprising:
   (A) crosslinkable organosilicon compounds, and
   (B) a filler component,
   (C) optionally, catalysts,
   (D) optionally, initiators,
   (E) optionally, accelerators,
   (F) optionally, inhibitors, and
   (G) optionally, further constituents other than (A) through (F), with the proviso that the content of the filler component (B) is at least 85% by weight, and the filler component (B) contains all fillers employed in the crosslinkable component, and contains at least 20% by weight, based on the total amount of (B), of coarse-grained fillers with grain sizes of from 0.2 mm to 10 mm, wherein the cross-linkable composition contains from 900 to 2400 parts by weight of the filler component (B) per 100 parts of cross-linkable organosilicon compounds (A), and wherein following crosslinking, the composition exhibits a Shore D hardness of 75 or greater.

2. The crosslinkable composition of claim 1, wherein the crosslinkable composition is a condensation crosslinkable composition, wherein crosslinkable groups are selected from the group consisting of silicon-bonded hydroxyl groups, silicon-bonded alkoxy groups, and mixtures thereof.

3. The crosslinkable composition of claim 1, wherein the organosilicon compounds (A) are organosilicon compounds crosslinkable by addition reaction.

4. The crosslinkable composition of claim 3, wherein the organosilicon compounds (A) are organosilicon compounds crosslinkable by a hydrosilylation addition reaction.

5. A method for producing a crosslinkable composition of claim 1, comprising mixing the individual components in any desired sequence.

6. A method for producing molded bodies based on organosilicon compounds, comprising shaping and curing a crosslinkable compositions produced by the method of claim 5.

7. The method of claim 6, wherein the crosslinkable compositions are shaped by means of mechanical pressure, wherein excess air in the composition is optionally removed partially or completely during shaping by application of an atmospheric low pressure to the mold, and further densification is optionally achieved during and/or after shaping by vibration of the mold, and the compositions are cured during and/or after shaping by increasing the temperature.

8. A molded body, produced by crosslinking a composition of claim 1.

9. The molded body of claim 8, wherein the molded body is an artificial stone.

10. The crosslinkable composition of claim 1, wherein at least one crosslinkable organosilicon compound is a crosslinkable silicone resin.

11. The crosslinkable composition of claim 10, wherein the crosslinkable silicone resin bears silicon-bonded hydroxyl and/or alkoxy groups.

12. The crosslinkable composition of claim 10, wherein the crosslinkable silicone resin bears silicon-bonded alkenyl groups.

13. The crosslinkable composition of claim 10, wherein the crosslinkable silicone resin bears silicon-bonded hydrogen.

14. A crosslinkable composition (M) comprising:
(A) crosslinkable organosilicon compounds, and
(B) a filler component,
(C) optionally, catalysts,
(D) optionally, initiators,
(E) optionally, accelerators,
(F) optionally, inhibitors, and
(G) optionally, further constituents other than (A) through (F), with the proviso that the content of the filler component (B) is at least 85% by weight, and the filler component (B) contains all fillers employed in the crosslinkable component, and contains at least 20% by weight, based on the total amount of (B), of coarse-grained fillers with grain sizes of from 0.2 mm to 10 mm, and wherein the cross-linkable composition contains from 900 to 2400 parts by weight of the filler component (B) per 100 parts of cross-linkable organosilicon compounds (A), wherein the crosslinkable compositions are addition crosslinking compositions wherein crosslinking is initiated by an organic peroxide.

15. The molded body of claim 14, which exhibits a hardness of at least 60 Shore D following crosslinking.

16. The molded body of claim 14, which exhibits a hardness of at least 75 Shore D following crosslinking.

17. A method for producing a molded body based on organosilicon compounds, comprising shaping and curing a crosslinkable composition (M) comprising:
(A) crosslinkable organosilicon compounds, and
(B) a filler component,
(C) optionally, catalysts,
(D) optionally, initiators,
(E) optionally, accelerators,
(F) optionally, inhibitors, and
(G) optionally, further constituents other than (A) through (F), with the proviso that the content of the filler component (B) is at least 85% by weight, and the filler component (B) contains all fillers employed in the crosslinkable component, and contains at least 20% by weight, based on the total amount of (B), of coarse-grained fillers with grain sizes of from 0.2 mm to 10 mm, and wherein the cross-linkable composition contains from 900 to 2400 parts by weight of the filler component (B) per 100 parts of cross-linkable organosilicon compounds (A), wherein excess air in the composition is removed partially or completely during shaping by application of an atmospheric low pressure to the mold, and/or further densification is achieved during and/or after shaping by vibration of the mold, and the compositions are cured during and/or after shaping by increasing the temperature.

18. The crosslinkable composition of claim 17, which exhibits a Shore D hardness of at least 60 following crosslinking.

19. The crosslinkable composition of claim 17, which exhibits a Shore D hardness of at least 75 following crosslinking.

20. A crosslinkable composition (M) consisting of:
(A) crosslinkable organosilicon compounds, and
(B) a filler component,
(C) optionally, catalysts,
(D) optionally, initiators,
(E) optionally, accelerators,
(F) optionally, inhibitors, and
(G) optionally, further constituents other than (A) through (F), with the proviso that the content of the filler component (B) is at least 85% by weight, and the filler component (B) contains all fillers employed in the crosslinkable component, and contains at least 20% by weight, based on the total amount of (B), of coarse-grained fillers with grain sizes of from 0.2 mm to 10 mm, wherein the cross-linkable composition contains from 900 to 2400 parts by weight of the filler component (B) per 100 parts of cross-linkable organosilicon compounds (A), wherein component (G) is selected from the group consisting of pigments, fragrances, oxidation inhibitors, agents for influencing electrical properties, flame proofing agents, functional silanes, silicates, water, and mixtures thereof.

* * * * *

UNITED STATES PATENT AND TRADEMARK OFFICE
CERTIFICATE OF CORRECTION

PATENT NO.       : 9,862,642 B2  
APPLICATION NO.  : 14/915085  
DATED            : January 9, 2018  
INVENTOR(S)      : Detlev Ostendorf et al.

Page 1 of 1

It is certified that error appears in the above-identified patent and that said Letters Patent is hereby corrected as shown below:

In the Claims

Column 18, Lines 13-14, Claim 17:  
After "composition is"  
Insert -- optionally --.

Column 18, Lines 15-16, Claim 17:  
After "low pressure to the mold"  
Delete "and/or" and  
Insert -- and --.

Signed and Sealed this  
Tenth Day of April, 2018

Andrei Iancu  
*Director of the United States Patent and Trademark Office*